(12) United States Patent
Nocera et al.

(10) Patent No.: US 10,779,677 B2
(45) Date of Patent: Sep. 22, 2020

(54) COFFEE MACHINE

(71) Applicant: LA SAN MARCO S.P.A., Gradisca D'Isonzo (GO) (IT)

(72) Inventors: Roberto Nocera, Gradisca D'Isonzo (IT); Amelio Sirch, Gradisca D'Isonzo (IT); Stefano Bolzan, Gradisca D'Isonzo (IT)

(73) Assignee: LA SAN MARCO S.P.A., Gradisca D'Isonzo (IT)

( * ) Notice: Subject to any disclaimer, the term of this patent is extended or adjusted under 35 U.S.C. 154(b) by 23 days.

(21) Appl. No.: 15/525,812

(22) PCT Filed: Oct. 28, 2015

(86) PCT No.: PCT/EP2015/002141
§ 371 (c)(1),
(2) Date: May 10, 2017

(87) PCT Pub. No.: WO2016/078741
PCT Pub. Date: May 26, 2016

(65) Prior Publication Data
US 2017/0332828 A1    Nov. 23, 2017

(30) Foreign Application Priority Data
Nov. 19, 2014  (IT) .............................. UD2014A0180

(51) Int. Cl.
*A47J 31/38*   (2006.01)
(52) U.S. Cl.
CPC .................................... *A47J 31/38* (2013.01)
(58) Field of Classification Search
CPC ........... A47J 31/38; A47J 31/46; A47J 31/469
USPC ........... 99/279, 284, 291, 300, 302 R, 302 P
See application file for complete search history.

(56) References Cited

U.S. PATENT DOCUMENTS

| | | | | |
|---|---|---|---|---|
| 3,364,842 A | * | 1/1968 | Valente ................... | A47J 31/30 99/298 |
| 2007/0227363 A1 | * | 10/2007 | Verna ....................... | A47J 31/38 99/279 |
| 2007/0277676 A1 | * | 12/2007 | Crivellin ................. | A47J 31/38 99/288 |

(Continued)

FOREIGN PATENT DOCUMENTS

| | | |
|---|---|---|
| FR | 1187907 A | 9/1959 |
| WO | 2005079641 A1 | 9/2005 |

OTHER PUBLICATIONS

Frengh to English machine translation of FR 1187907.*
International Search Report for corresponding International Application No. PCT/EP2015/002141.

*Primary Examiner* — Michael G Hoang
(74) *Attorney, Agent, or Firm* — Egbert Law Offices, PLLC

(57) ABSTRACT

An apparatus for making espresso coffee has at least one delivery unit, a hydraulic circuit connected to the delivery unit, and a driving device having a lever movable between a first position and a second position. The delivery unit has a first cylinder with a piston slidably mounted therein and at least one braking device having a second cylinder. The second cylinder is connected to a circuit independent of the first cylinder. The movement of the first cylinder charges water and discharges water from the first cylinder.

13 Claims, 10 Drawing Sheets

(56) References Cited

U.S. PATENT DOCUMENTS

2010/0300300 A1\* 12/2010 Denisart ............... F16K 11/027
99/302 R
2018/0360257 A1\* 12/2018 Dionisio ................ A47J 31/38
2019/0290050 A1\* 9/2019 Maltoni ................ A47J 31/525

\* cited by examiner

COFFEE MACHINE

TECHNICAL FIELD

The present invention relates to a machine for making espresso coffee of the type with lever driving.

The present invention also relates to a kit of elements for adapting a machine (1) for making espresso coffee.

PRIOR ART

In the field of production of professional machines for espresso coffee the machines of the type with lever driving are known. The machines can be provided with one, two, three or more coffee delivery units, each of which is provided with a support for a delivery cup containing ground coffee and each provided with a corresponding lever for activating the delivery of hot water from the machine towards the delivery cup. Although in the figures reference is made to a solution of a coffee machine provided with two delivery units it will be evident that the present invention can be applied to a generic coffee machine provided with at least one delivery unit. Each delivery unit comprises a first cylinder inside which a first piston slides whose movement is obtained by means of a lever linkage, which is connected to a lever, which is manually driven by the operator. The movement of the first piston from a first initial position to a second position causes the charging of hot water within a housing of the first cylinder. The hot water comes from a boiler inside the coffee machine. When the piston slides back from the second position returning towards the first initial position, the water charged in the housing of the cylinder is pushed to go through the delivery cup in which the ground coffee is present. The return of the piston occurs by means of the pushing action exerted by one or more springs previously compressed by the lever driving action by the operator. Therefore, in order to obtain the delivery of coffee, the operator activates the lever by driving it from the first resting position to a second locking position causing the movement of the piston in the cylinder and the charging of hot water. Then the operator slightly moves the lever from the locking position in the direction opposite to that according to which the operator performed the driving action, unlocking the lever.

Patent application FR1187907 describes a machine for making espresso coffee provided with a delivery piston connected to a driving lever which is further provided with an automatic time delay mechanism of the lifting action of the driving lever after the lever has been lowered and during the infusion phase of the mixture of ground coffee, said time delay mechanism being intended to allow for an extension of the infusion time of the machine, at the end of which the holding action of the lifting of the lever is nullified thus enabling the lever to return to the initial position.

Patent application WO2005/079641 describes a machine for making espresso coffee comprising a water tank, a delivery unit, connection means interposed between the tank and the delivery unit wherein the connection means comprise a manual pumping unit for conveying the water from the tank to the coffee delivery unit and a heat exchanger which is provided with a conduit interposed between the manual pumping unit and the delivery unit and which extends within a boiler, such solutions being adopted to control in a more accurate way the temperature of the water which is delivered towards the mixture for making coffee.

Problems of the Prior Art

When the driving lever returns in position towards the first initial position under the action of the one or more springs driving the piston, which causes the outflow of hot water from the first cylinder, different operating conditions are likely to occur. If a filter-holding cup with the correct amount of ground coffee was inserted in the delivery unit, the return of the lever occurs in a time ranging from a few seconds up to about half a minute. In this case the return speed of the lever is slow because of the braking effect due to the presence of the coffee and to the resistance exerted by the coffee during the passage of hot water in the delivery cup. As a consequence, in that case, the operation and the movement of the return lever are included in the standard operating conditions and do not involve dangers of any type for the operator. Furthermore, it is also possible to drive the lever again also in an intermediate position of the return stroke not encountering a reaction force by the lever itself due to the action of the springs. On the contrary, if in the delivery unit no delivery cup was inserted or a delivery cup without the coffee or with an insufficient amount of coffee was inserted or if the water coming from the boiler is not at the correct pressure for operation, the return of the lever occurs in a very rapid time in the order of some fractions of second. In this case the return speed of the lever is very high and the danger for the operator is very high. Moreover, in no way it is possible to be able to drive the lever again in an intermediate position.

The pressure provided inside the boiler for the correct operation of the machine is normally between 0.8 and 1.2 bars. To ensure the correct charging of the water in the chamber of the delivery unit a relative minimum pressure is sufficient with respect to the atmospheric pressure even of just 0.1 bars, therefore just higher than the atmospheric pressure of the environment.

A similar behaviour occurs when the machine is off with or without water in the boiler.

Aim of the Invention

The aim of the present invention is to provide a machine for making espresso coffee of the type with lever driving which is not subject to abrupt return movements of the driving lever also when the operator drives the lever in operating conditions different from those required, for example in case of non-insertion of a delivery cup or in case of insertion of a delivery cup without the coffee or with an insufficient amount of coffee or in case of wrong pressure of the water coming from the boiler.

Concept of the Invention

The aim is achieved by the characteristics of the main claim. The sub-claims represent advantageous solutions.

Advantageous Effects of the Invention

The solution according to the present invention, by the considerable creative contribution the effect of which constitutes an immediate and important technical progress, presents various advantages.

The solution according to the invention, without changing the operation of the machine for making coffee with respect to that to which the operator is used, considerably increases the safety of use of the machine.

The solution according to the invention, besides eliminating the risks resulting from an error of the operator who drives the lever in wrong conditions of charging of the delivery cup, also allows to eliminate the risks resulting from possible malfunctions of the machine, for example in case of wrong pressure of the water coming from the boiler. In this case the operator may not notice the malfunction of the machine and, also having charged the dispensing cup correctly, he/she may be exposed to the risk of a sudden and unexpected return of the driving lever with an excessive return speed. By the solution according to the invention this risk is prevented, making the machine safer. Furthermore, the solution according to the invention also improves the operation of the machine also in the conditions of normal use, making the return movement of the lever after its driving less abrupt, thus improving machine operation.

Moreover, the solution according to the invention can be carried out with different maximum return speeds of the lever without modifying the force required to the operator during the driving phase of the lever itself and without altering the extraction of coffee in any way.

DESCRIPTION OF THE DRAWINGS

In the following an embodiment solution is described with reference to the enclosed drawings which are to be considered as a non-exhaustive example of the present invention in which.

DESCRIPTION OF THE INVENTION

Figure 1:
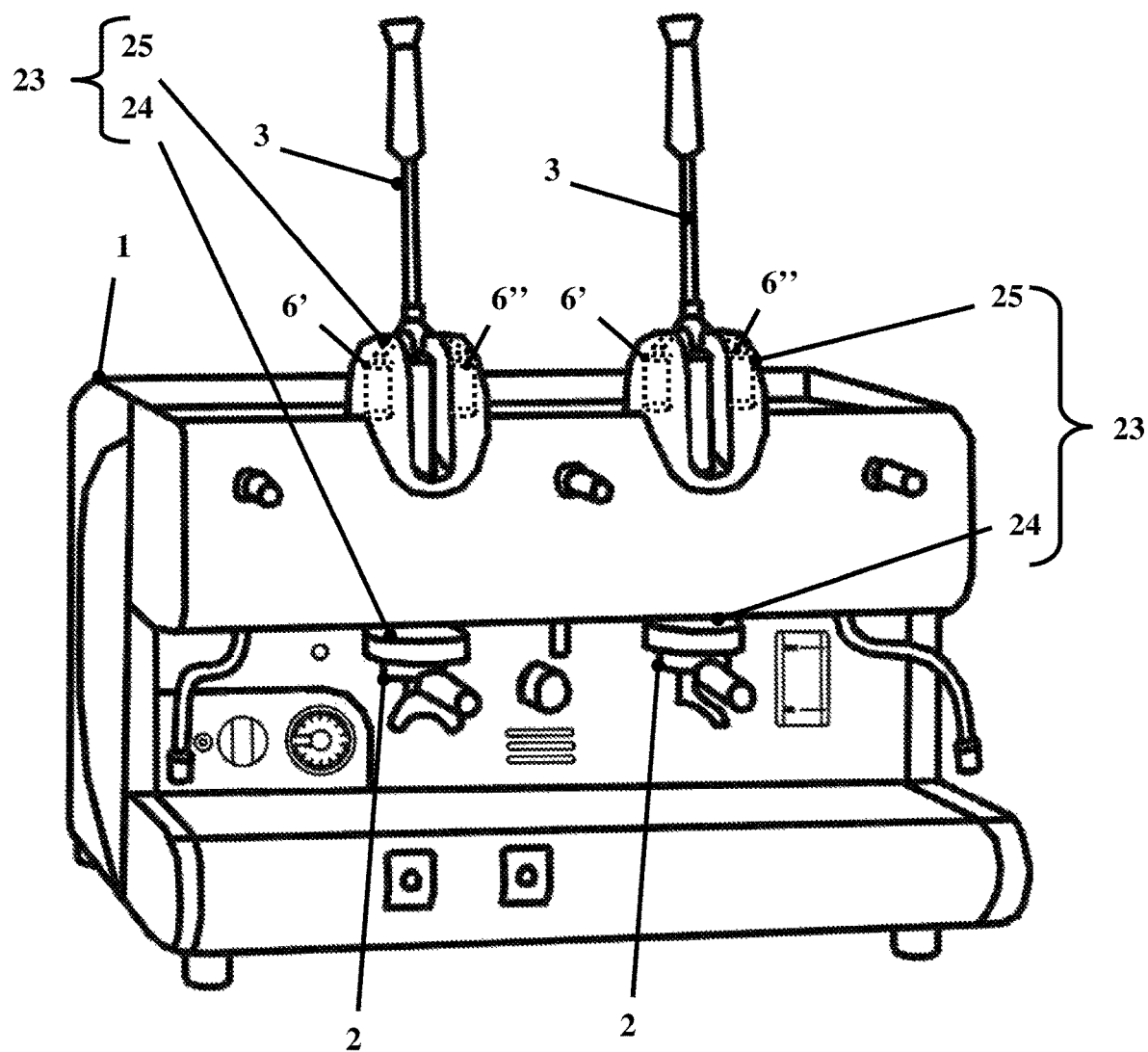
FIG. 1 shows a schematic perspective view of the machine for making coffee made in compliance with the present invention.
Figure 2:
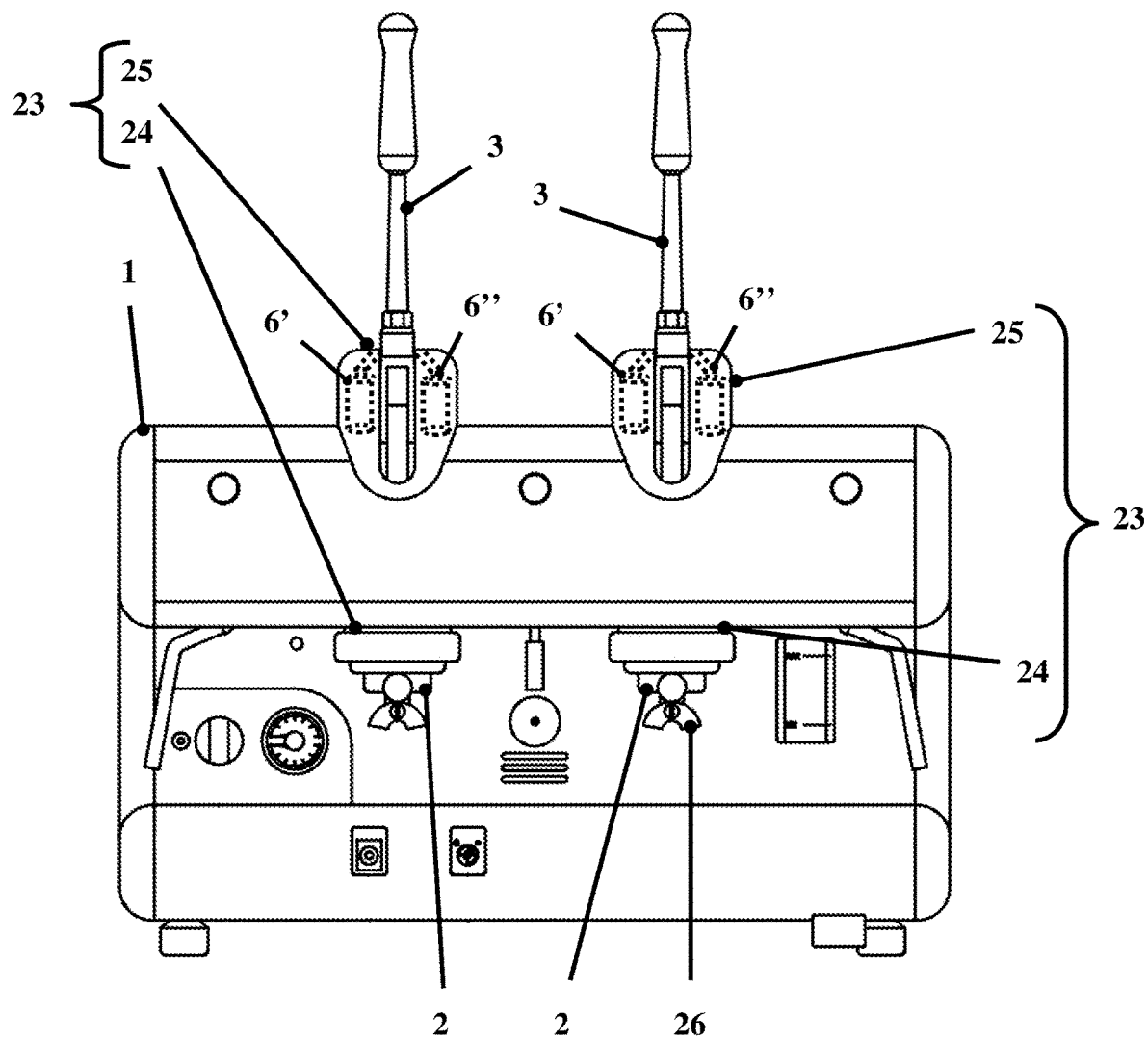
FIG. 2 shows a front view of the machine of FIG. 1.
Figure 3:
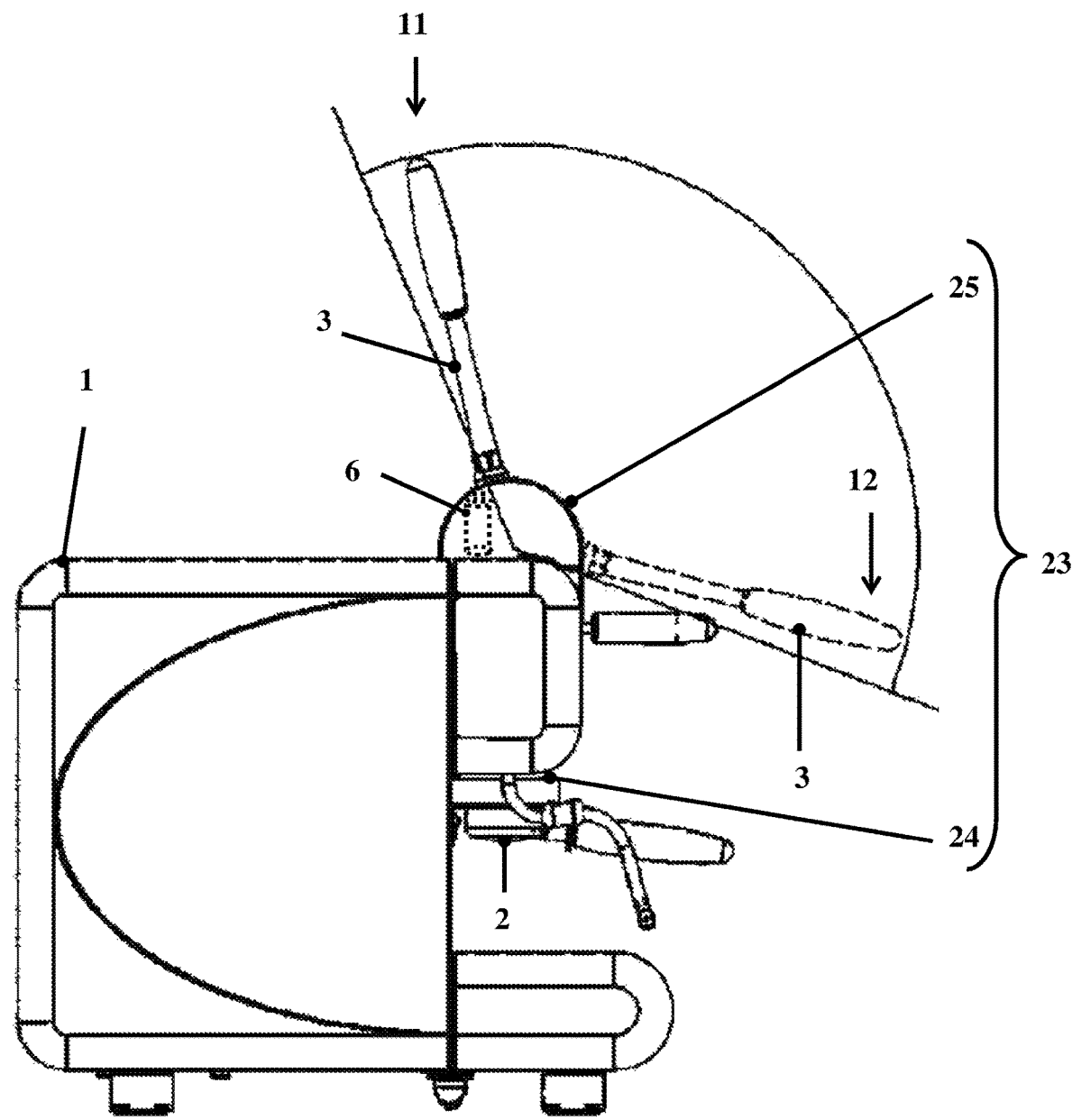
FIG. 3 shows a side view of the machine of FIG. 1.
Figure 6:
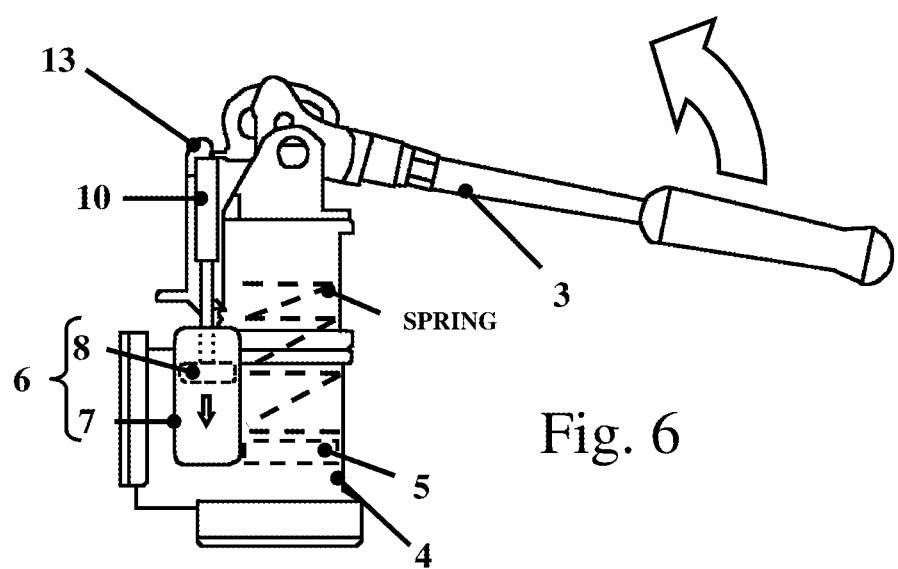
Figures 7, 8:
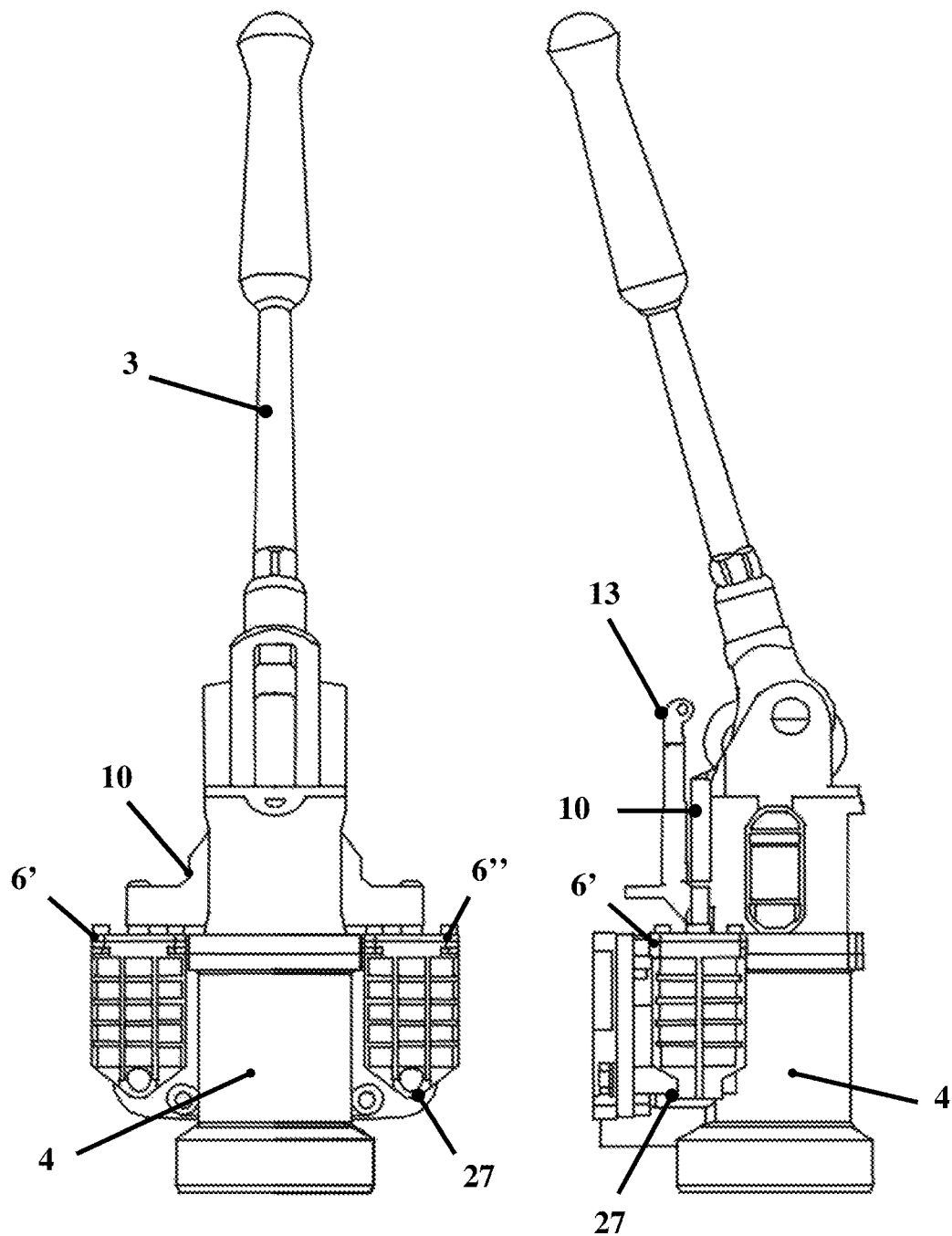
FIG. 7 shows a front view of the driving lever of the machine for making coffee made according to the present invention in a first operating condition.
FIG. 8 shows a side view of the lever of FIG. 7.

With reference to the figures (FIG. 1, FIG. 2, FIG. 3) the machine (1) for making coffee according to the invention is of the type provided with at least one delivery unit (23) which is provided with an attachment (24) for a delivery cup (2) and with a driving device (25) provided with a lever (3). Although in the figures reference is made to a solution of a machine (1) for making coffee provided with two delivery units (23), it will be evident that the present invention can be applied to a generic machine (1) for making coffee provided with at least one delivery unit (23). Each delivery unit (23) comprises (FIG. 4, FIG. 5 FIG. 6, FIG. 7, FIG. 8, FIG. 9, FIG. 10) a first cylinder (4) inside which a first piston (5) slides whose movement is obtained by means of a lever linkage mechanically connected to a lever (3), which is manually driven by the operator. The movement of the first piston (5) from a first initial position (FIG. 4) to a second position (FIG. 5) causes the charging of hot water within a housing of the first cylinder (4). The hot water comes from a boiler inside the coffee machine, which is connected to the delivery unit (23) by means of a hydraulic circuit (13). When the first piston (5) slides back from the second position (FIG. 5) returning towards the first initial position (FIG. 4), the water charged in the housing of the first cylinder is pushed (FIG. 6) by the return movement of the first piston (5) and is made to pass through the delivery cup (2) connected to the delivery unit (23). The water passes through the delivery cup (2) in which there is the ground coffee and exits (FIG. 2) in the form of liquid coffee from one or more delivery nozzles (26) of the cup (2) to fall down into a cup placed on a support plane of the machine (1) below the delivery nozzle (26). The return of the first piston (5) occurs by means of the pushing action exerted by one or more return means for example in the form of one or more springs (7a) previously compressed by the action of traction of the lever (3) by the operator. Therefore, in order to obtain the delivery of coffee, the operator drives the lever (3) moving it from the first resting position (FIG. 1, FIG. 2, FIG. 3, FIG. 4, FIG. 7, FIG. 8) to a second locking position (FIG. 3, FIG. 5, FIG. 9, FIG. 10) causing the movement of the first piston (5) in the first cylinder (4) and the charging of hot water. Then the operator slightly moves the lever (3) from the locking position (FIG. 3, FIG. 5, FIG. 9, FIG. 10) in the direction opposite to that according to which the operator performed the driving action, unlocking the lever (3). The solution according to the invention provides (FIG. 1, FIG. 2, FIG. 3, FIG. 4, FIG. 5, FIG. 6, FIG. 7, FIG. 8, FIG. 10) the use of a servo-control system of the movement of the lever (3). By means of the servo-control system one advantageously obtains an adjustment of the return speed of the lever (3) which constitutes the movable part manually driven by the operator during the use of a machine (1) for making coffee. In this way two results are obtained. The first result consists in making less "abrupt" the movement of the lever linkage of the driving device (25) which is mechanically connected to the lever (3) during the phase of return to the first position of the lever (3) after a driving action of the latter. The second result consists in considerably reducing the return speed of the lever (3) to such a value as to eliminate the risk of injuries for the operator in wrong charging conditions of the delivery cup (2). The servo-controlled lever system (3) is designed to be easily applied on the existing delivery units (23) as well in order to extend the beneficial effects in terms of safety to the existing machines (1) as well. The application of the system according to the invention allows to obtain two important practical advantages described in the following.

The first advantage is related to the fact that the system according to the invention with the servo-controlled lever (3) allows to adjust the maximum return speed that the lever (3) can have, without modifying the force required to the operator during the driving phase of the lever (3) itself. Also in the case in which the operator retained the lever (3) also during the return of the latter, he/she would perceive a much less strong pulling action with respect to the solution without the system according to the invention with the servo-controlled lever. Moreover, the lower return speed allows the operator to leave hold of the lever (3) and afterwards to seize it again in the full control of the operation, which, otherwise, in the solution without the servo-controlled lever system, would be impossible in the case in which the return movement were too fast.

The second advantage is related to the fact that the system according to the invention with the servo-controlled lever (3) allows to eliminate the risk of injuries for the operator or for other people on the trajectory of the lever (3) present on the current delivery unit (23) without the proposed solution in the case in which it was driven in the absence of the delivery cup (2) inserted in the delivery unit or when the machine is off or with the delivery cup (2) inserted in the delivery unit but without ground coffee or with an insufficient amount of ground coffee. Risks are eliminated because the speed of the lever (3) in the return phase in these critical steps is the maximum speed allowed by the servo-controlled lever (3) system according to the invention and, therefore, compatible with a condition of maximum safety for the operator. In this condition the minimum possible return time of the lever can be set for example between 1 and 2 seconds, or higher values, if desired. As a consequence, the kinetic energy of the lever (3) in case of impact is strongly reduced to values, which are not dangerous for the operator.

The system according to the invention is made up (FIG. 7, FIG. 8, FIG. 9, FIG. 10, FIG. 11, FIG. 12, FIG. 13, FIG. 14, FIG. 15, FIG. 16) of at least one braking device (6), preferably of a pair of braking devices (6) comprising a first braking device (6') and a second braking device (6"). The at least one braking device (6) is applied near the end of the lever (3) which activates the lever linkage of the driving device (25) which causes the movement of the first piston (5) for the delivery of water towards the delivery cup (2). In case of two braking devices (6), the first braking device (6') and the second braking device (6") are applied on two opposite ends of the driving device (25) and are connected to the latter by means of a suitable connection (10), for example in the form of a shaped plate. The braking device (6, 6', 6") is fixed to the load-bearing structure of the machine (1), for example by means of fixing means (27) comprising a calibrated hole and pin. By acting on the lever (3) to move it from the first resting position (FIG. 4, FIG. 7, FIG. 8) to the second locking position to start delivery (FIG. 5, FIG. 9, FIG. 10), the connection (10) with the at least one braking device (6) is lifted. The connection (10) is fixed (FIG. 11, FIG. 12, FIG. 13, FIG. 14, FIG. 15, FIG. 16, FIG. 17, FIG. 18) to a rod (9) of the braking device (6) which in its turn is connected to a second piston (8) which slides within a second cylinder (7) of the braking device (6). In the present description reference will be made to a solution comprising at least one braking device (6, 6', 6"), but it will be evident that the same considerations also apply to the case of a solution with several braking devices, such as the solution represented with a first braking device (6') and a second braking device (6") which are connected by means of the respective rods (9) to a common connection (10) which constitutes a coupling interface among the several braking devices and the driving device (25) of the delivery unit (23). The coupling between the connection (10) and the driving device (25) can be made on the lever (3) or on the lever linkages of the driving device (25) which are driven by the lever (3) itself. The second cylinder (7) is shaped in such a way as to not create obstacles during the phase of lowering of the lever (3) and, therefore, the operation of lowering of the lever (3) occurs for the operator in the same way as in the prior art machines, meaning that the operator will not perceive a different driving force with respect to that to which he/she is used. In other words the second cylinder (7) is shaped in such a way as to apply an essentially null braking force during the phase of movement of the lever (3) from the first lever position to the second lever position. The servo-control action occurs only at the moment in which the operator slightly moves the lever from the locking position by rotating it in the direction opposite to the driving direction, that is to say, when the lever (3) moves under the action of the one or more return means for example in the form of one or more springs. Due to the braking action by the connection (10) which is connected by means of the rod (9) to the second piston (8) internal to the second cylinder (7), in the return stroke of the lever (3), the lever (3) is forced to move with a reduced speed. The minimum return time of the lever (3) can be set and can be in the order of 1 to 2 seconds in the worst operating conditions, which correspond to the conditions of lack of coffee in the delivery cup (2) or of driving of the lever (3) with the machine off or in the absence of water or operating pressure not corresponding to the conditions required by the machine (1). In general, the calibrated hole of the first passage (19) can be sized in such a way as to encumber the fluid flow between first Chamber (21) and the second chamber (22) according to such a configuration that the return time of the lever (3) from the second lever position to the first lever position is between 1 and 4 seconds. The same slowdown effect is also obtained if the operator, while he/she accompanies the movement of the lever (3), releases it in an intermediate position between the resting position and the locking position. This result makes the system with the lever unit much more versatile than a system without the servo-controlled lever system because it does not need the operator to always keep hold of the lever (3) during the movement of the latter and protects the operator from risks of impact in case of accidentally leaving hold of the lever.

Therefore, the system with the servo-controlled lever (3) comprises a second cylinder (7) provided with a rod (9) connected to a second piston (8) sliding within the second cylinder (7) and which realizes the braking device (6, 6', 6"). The operating principle is based on the concept of passage of a fluid, preferably a liquid or a gas, between two chambers (21, 22) put in communication with each other through passages made in the second piston (8) and suitably sized to obtain the desired braking action of the lever (3). In detail the braking device (6, 6', 6") is made up (FIG. 11, FIG. 12, FIG. 13, FIG. 14, FIG. 15, FIG. 16, FIG. 17, FIG. 18, FIG. 19) of a second internally hollow cylinder (7) within which there is a second piston (8, 8', 8") sliding within the cavity (29), the second piston (8, 8', 8") being provided with a first perimetrical sealing gasket (15) on the coupling interface between the perimetrical surface of the second piston (8, 8', 8") and the surface of the cavity (29). The second cylinder (7) is provided with a closing wall having a circular base provided with fixing means (27) for fixing the braking device (6, 6', 6") to the machine (1). The base of the cylindrical shape opposite with respect to the base on which there are the fixing means (27) is open and is provided with a seat (28) accommodating a cover (14) with the interposition of a second perimetrical sealing gasket (16) on the coupling interface between the perimetrical surface of the cover (14) and the surface of the seat (28). The cover (14) is provided with a through-hole (30) through which the rod (9) passes, which is fixed to the second piston (8, 8', 8") and which comes out of the braking device (6, 6', 6") coupling with the connection (10). The hole (30) is provided with a third sealing gasket (17) on the coupling interface between the perimetrical surface of the rod (9) and the surface of the hole (30).

The movement of the second piston (8, 8', 8") inside the second cylinder (7) determines the formation of two chambers, of which a first chamber (21) and a second chamber (22) which are separated from each other by the movable interposition of the second piston (8, 8', 8") which, following the movement transmitted by means of the lever (3) of the machine (1), slides within the cavity (29) causing a variation of the volume of the first chamber (21) and of the second chamber (22) according to a configuration in which in each moment the sum of the volume of the first chamber (21) and of the second chamber (22) is equal to the volume of the cavity (29) minus the volume occupied by the second cylinder (8) and by the rod (9). The first chamber (21) and the second chamber (22) contain a fluid, preferably a liquid such as distilled water or oil for hydraulic circuits. The second gasket (16) and the third gasket (17) prevent the fluid from coming out of the cavity (29) of the braking device (6, 6', 6") while the first gasket (15) prevents the fluid from passing from the first chamber (21) to the second chamber (22) or vice-versa perimetrically with respect to the coupling surface between the cavity (29) and the second piston (8, 8', 8"). The passage of the fluid between the first chamber (21) and the second chamber (22), therefore, can occur only through one or more first passages (19) and one or more second passages (18) which are obtained in the form of through-openings on the body of the second piston (8, 8', 8") and which put in communication the first chamber (21) and the second chamber (22). The second passage (18) is provided with:
  a set of one or more first conduits (31) on the side of the second passage (18) facing the second chamber (22);
  a set of one or more second conduits (32) on the side of the second passage (18) facing the first chamber (23);
  a third chamber (33) arranged between the first conduits (31) and the second conduits (32), said third chamber (33) having a greater section with respect to the section of the first conduits (31) and of the second conduits (32) and putting in flow communication with each other the first conduits (31) and the second conduits (32);
  an obstruction element (20) placed within the third chamber (33), said obstruction element (20) being free to move within the third chamber (33) itself under the pushing action of the fluid flow within the second passage (18).

The side of the second passage (18) facing the second chamber (22) is opposite to the side of the second passage (18) facing the first chamber (23) with respect to the shape of the second piston (8, 8', 8").

The obstruction element (20) and the third chamber (33) are shaped in such a way that:
  when the obstruction element (20) is placed inside the third chamber (33) in a dislocated position towards the first conduits (31), the obstruction element (20) causes the obstruction of the first conduits (31) interrupting the flow communication between the first conduits (31) and the second conduits (32);
  when the obstruction element (20) is placed within the third chamber (33) in a dislocated position towards the second conduits (32), the obstruction element (20) allows for the establishment of the flow communication and does not cause the obstruction of the first conduits (31) or of the second conduits (32), establishing the flow communication between the first conduits (31) and the second conduits (32).

Preferably the obstruction element (20) is a sphere having a smaller diameter with respect to the sizes of the third chamber (33) and having a greater diameter with respect to the diameter of one single first conduit (31) and having a greater diameter with respect to the diameter of one single second conduit (32). Preferably the second conduits (32) are at least two second conduits (32), preferably three second conduits (32), even more preferably four or more second conduits (32) which are arranged radially with respect to a central axis of the third chamber (33).

In a first position (11) the second piston (8, 8', 8") is (FIG. 11) arranged within the second cylinder (7) in a condition in which the volume of the first chamber (21) is much smaller than the volume of the second chamber (22), at the most the volume of the first chamber (21) being null and the volume of the second chamber (22) being optionally essentially equal to the volume of the cavity (29) minus the volume occupied by the second piston (8, 8', 8"). It will be evident that it is not strictly necessary that in the first position (11) the volume of the first chamber (21) is null, it being instead necessary that the second chamber (22) has such a volume as to contain most of the fluid contained in the cavity (29).

In a second position (12) the second piston (8, 8', 8") is (FIG. 13) arranged within the second cylinder (7) in a condition in which the volume of the first chamber (21) is much greater than the volume of the second chamber (22), at the most the volume of the second chamber (22) being null and the volume of the first chamber (21) being optionally essentially equal to the volume of the cavity (29) minus the volume occupied by the second piston (8, 8', 8"). It will be evident that it is not strictly necessary that in the second position (12) the volume of the second chamber (22) is null, it being instead necessary that the first chamber (21) has such a volume as to contain most of the fluid contained in the cavity (29).

The second piston (8, 8', 8") is movable within the second cylinder (7) between the first position (11) and the second position (12) and vice-versa.

During the movement (FIG. 12) of the second piston (8, 8', 8") from the first position (11) towards the second position (12) the fluid passes from the second chamber (22) to the first chamber (21) through the second passage (18). The fluid penetrates the first conduits (31) and pushes the obstruction element (20) in the dislocated position towards the second conduits (32), the obstruction element (20) not causing in this way the obstruction of the first conduits (31) or of the second conduits (32) and leaving free the flow communication between the first conduits (31) and the second conduits (32), therefore letting the fluid pass from the second chamber (22) to the first chamber (21). The second passage (18) or the second passages (18) are sized and structured in order not to constitute an obstacle to the movement of the second piston (8, 8', 8") from the first position (11) towards the second position (12).

During the movement (FIG. 14) of the second piston (8, 8', 8") from the second position (12) towards the first position (11) the fluid passes from the first chamber (21) to the second chamber (22) through the first passage (19). With reference to the second passage (18), it is closed as the fluid penetrates the second conduits (32) and pushes the obstruction element (20) in the dislocated position towards the first conduits (31), the obstruction element (20) causing the obstruction of the first conduits (31) interrupting the flow communication between the first conduits (31) and the second conduits (32), therefore preventing the passage of the fluid from the first chamber (21) to the second chamber (22) by means of the second passage (18) and thus forcing it to pass only through the first passage (19). The first passage (19) comprises a calibrated hole having very small section.

Said forced passage through the calibrated hole slows down the movement of the second piston (8).

The rod (9) of the braking device (6, 6', 6") is connected to the connection (10) which in its turn is coupled with the driving device (25) according to a configuration in which:
- the phase of lowering of the lever (3) by the operator to start the phase of delivery of the coffee causes the charging of the one or more return means, for example in the form of one or more springs compressed by the traction action of the lever (3) and causes (FIG. 12) the passage of the second piston (8, 8', 8") from the first position (11) towards the second position (12) in such a way as to not create obstacles during the lowering phase of the lever (3) and, therefore, the operation of lowering the lever (3) occurs for the operator in the same way as in the prior art machines, meaning that the operator will not perceive a different driving force with respect to that to which he/she is used;
- the return phase of the lever (3), caused by the reaction of the one or more return means, causes (FIG. 14) the passage of the second piston (8, 8', 8") from the second position (12) towards the first position (11) in such a way as to exert the braking action on the lever (3).

In practice in a first operating phase the operator manually drives the lever (3) by pulling it towards himself/herself. The movement of the lever (3) follows (FIG. 3) an arc of a circle which is converted by the lever linkage into a vertical movement of the first piston (5) and, by means of the connection (10), into a vertical movement of the second piston (8, 8', 8"). In said first phase the first piston (5) passes from a first initial position (FIG. 4) to a second position (FIG. 5) causing the charging of hot water within a housing of the first cylinder (4). Simultaneously in said first phase the second piston (8, 8', 8") passes (FIG. 12) from the first position (11) towards the second position (12) and, as a consequence, there is the passage of the fluid from the second chamber (22) to the first chamber (21) through one or more second passages (18). As previously explained, the obstruction element (20) is pushed in the dislocated position towards the second conduits (32), the obstruction element (20) not causing in this way the obstruction of the first conduits (31) or of the second conduits (32) and leaving free the flow communication between the first conduits (31) and the second conduits (32), therefore letting the fluid pass from the second chamber (22) to the first chamber (21) without causing an increase in the tensile strength of the lever (3) perceivable by the operator.

The first operating phase continues until the operator has driven the lever (3) into a locking position. In the locking position the first piston (5) of the first cylinder (4) is fixed in the final position corresponding to the complete charging of the housing of the first cylinder (4) with hot water for making coffee. In this condition (FIG. 13) the second piston (8, 8', 8") has reached the second position (12) and most of the fluid of the second cylinder (7) is contained in the first chamber (21).

In a second operating phase, the operator manually unlocks the lever (3) which thus begins its return phase under the pushing action exerted by the reaction of the one or more return means. In said second phase the first piston (5) passes from the second position (FIG. 5) to the first position (FIG. 4) pushing the hot water from the housing of the first cylinder (4) towards the delivery cup (2). Simultaneously in said second phase the second piston (8, 8', 8") passes (FIG. 14) from the second position (12) towards the first position (11) and, as a consequence, there is the passage of the fluid from the first chamber (21) to the second chamber (22) through the calibrated hole of the first passage (19) because, as previously explained, the obstruction element (20) is pushed in the dislocated position towards the first conduits (31) causing their obstruction and leaving free only the flow communication between the first chamber (21) and the second chamber (22) by means of the calibrated hole of the first passage (19), causing the braking of the return movement of the lever (3). This ensures reaching high safety conditions also in the worst operating conditions which correspond to the conditions of lack of coffee in the delivery cup (2) or of driving of the lever (3) with the machine off or in the absence of water or operating pressure not corresponding to the conditions required by the machine (1).

The second operating phase continues until the lever (3) has returned to the initial resting position (FIG. 1, FIG. 2, FIG. 7, FIG. 8). In this condition (FIG. 12) the second piston (8, 8', 8") has reached the first position (11) and most of the fluid of the second cylinder (7) is contained in the second chamber (22).

The physical principle by which it is possible to obtain what has been stated above by using the servo-controlled lever system is based on the concept of forced passage of fluid contained in the second cylinder (7) through the calibrated size hole. Preferably the fluid is an incompressible liquid and, in this case, the flow rate of the incompressible liquid passing through the established calibrated size hole is given by the following formula:

$$Q = C \times Y \times A \times (2 \times DP/r)^{1/2}$$

where:
- "Q" represents the volumetric flow rate expressed in $m^3/s$;
- "C" represents the flow coefficient of the calibrated hole, which is a parameter determined by the geometry of the system;
- "Y" represents the expansion factor, for which, in the case of incompressible liquid the formula Y=1 applies;
- "A" represents the diametral area of the holes of passage of the fluid in $m^2$;
- "DP" represents the pressure difference between the two sides of the calibrated hole expressed in Pa, that is to say, the pressure difference between the first chamber (21) and the second chamber (22);
- "r" represents the density of the liquid expressed in $kg/m^3$.

Although in the present description reference is mainly made to a fluid in the form of an incompressible liquid fluid, it will be evident that the same considerations also apply to the case of a fluid in the form of gas, in which case it is necessary to introduce in the formula above a compressibility coefficient which takes into account the expansion or compression to which the gas is subjected when passing from one pressure to another. However, keeping this aspect into consideration, the same considerations relating to the case of a fluid in the form of an incompressible liquid fluid will apply.

By analysing the formula, what is evident is that the volumetric flow rate (Q) of the liquid, that is to say, the amount of liquid which in the unit of time passes from the first chamber (21) to the second chamber (22) through the first passage (19) is linked to the size of the calibrated hole of the first passage (19) which is defined by the value of the diametral area (A) of the calibrated hole and by the pressure difference (DP) which is generated between the two chambers during the phase of movement of the second piston (8) from the second position (12) to the first position (11), which is caused by the return movement of the lever (3). The greater the values of the diametral area (A) of the calibrated hole and pressure difference (DP), the greater is the volumetric flow rate (Q) of the liquid and, as a result, the shorter is the return time of the second piston (8) and, therefore, of the lever (3).

Therefore, it is necessary to consider that:
- the value of the diametral area (A) of the calibrated hole is established by means of the choice of the diameter of the calibrated hole;
- the maximum pressure difference (DP) value is determined by the maximum force which may act on the second piston (8) by means of the lever (3) which is pushed by the return means driven by the lever (3), a value which is maximum in the case of use of the machine (1) without the delivery cup (2) being inserted and/or in the absence of pressurized hot water in the boiler.

From tests carried out it was proven that a diameter of the calibrated hole between 0.75 mm and 1 mm is such as to ensure a return time of the lever (3) in the most dangerous conditions at a value between 1 second and 2 seconds. In general the calibrated hole can have a diameter between 0.4 mm and 1.2 mm, preferably between 0.75 mm and 1.0 mm, even more preferably of 0.8 mm. By comparing such values with the values currently valid for the prior art machines which are not provided with the braking device (6) according to the invention, which values are included between 0.1 seconds and 0.2 seconds, it can be seen that the return speed of the lever (3) is reduced by ten times. Considering that the kinetic energy of a moving mass is proportional to the square of the speed, it is inferred that the system according to the invention allows to reduce the kinetic energy of a possible impact with the moving lever (3) by 100 times, reducing by the same amount the danger currently present on the lever machines in the absence of a servo-controlled lever system.

It is also observed that in the first operating phase in which the operator manually drives the lever (3) by pulling it towards himself/herself, the fluid passes through the opening or the openings constituted by the second passage (18) or by the second passages (18). Simultaneously, since in this phase the first passage (19) is obstructed, the fluid (FIG. 12) can also pass through the first passage (19). In that case, therefore, the diametral area (A) is made up (FIG. 12) of the sum of:
- diametral areas of the first conduit (31) or of the first conduits (31) in the case of the presence of several second passages (18);
- diametral area of the calibrated hole of the first passage (19).

In the first operating phase, therefore, the overall diametral area (A) is much larger than the diametral area (A) in the second operating phase, allowing to obtain a very high flow rate value so as to not affect the action of movement of the lever (3) by the operator. Preferably (FIG. 19) the second piston (8) is provided with three second passages (18), each of which comprises a first conduit (31) which through the third chamber (33) is then divided into four second conduits (32).

As regards the second passage (18):
- the first conduit (31) has a diameter between 2 and 5 mm, preferably between 3 and 4 mm, even more preferably of 3.5 mm;
- the second conduit (32) has a diameter between 1.5 and 4 mm, preferably between 1.8 and 3 mm, even more preferably of 2 mm.

As previously explained, the obstruction element (20) is preferably a sphere having a smaller diameter with respect to the size of the third chamber (33) and having a greater diameter with respect to the diameter of one single first conduit (31) and having a greater diameter with respect to the diameter of one single second conduit (32). For example in the case of a first conduit (31) having a diameter of 3.5 mm and a second conduit (32) having a diameter of 2 mm, the obstruction element (20) can be a sphere with a diameter between 4 and 6 mm, preferably of 5 mm.

The second piston (8) has a diameter between 25 and 45 mm, preferably between 30 and 40 mm, even more preferably of about 34 mm. The cavity of the second cylinder (7) has a height between 45 and 65 mm, preferably between 50 and 60 mm, even more preferably of about 55 mm. The cavity of the second cylinder (7) has a bore corresponding to the diameter of the second piston (8).

The rod (9) preferably has a diameter of 10 mm and a length of 57 mm or greater in case of a greater height of the second cylinder (7).

Preferably (FIG. 19) the second piston (8, 8', 8") is made in the form of a first half-shell (8') and a second half-shell (8") coupled with each other, wherein on the reciprocal coupling surfaces between the first half-shell (8') and the second half-shell (8") one obtains:
- a cavity for the first perimetrical gasket (15);
- a third chamber (33) for each of the second passages (18) present;
- the first conduits (31);
- the second conduits (32);
- the first passage (19).

Figures 4, 5:
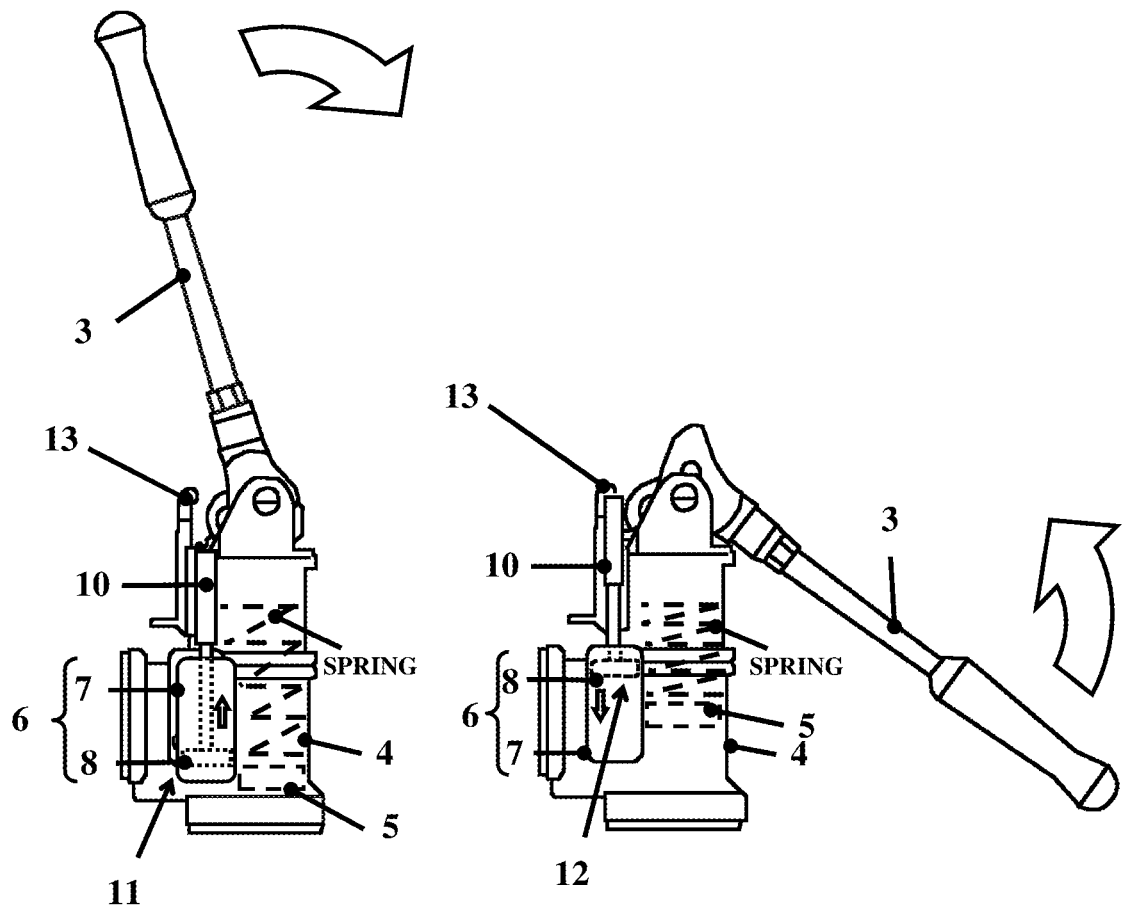
FIG. 4, FIG. 5, FIG. 6 show the operating sequence of the driving lever of the machine for making coffee made according to the present invention.
Figure 9:
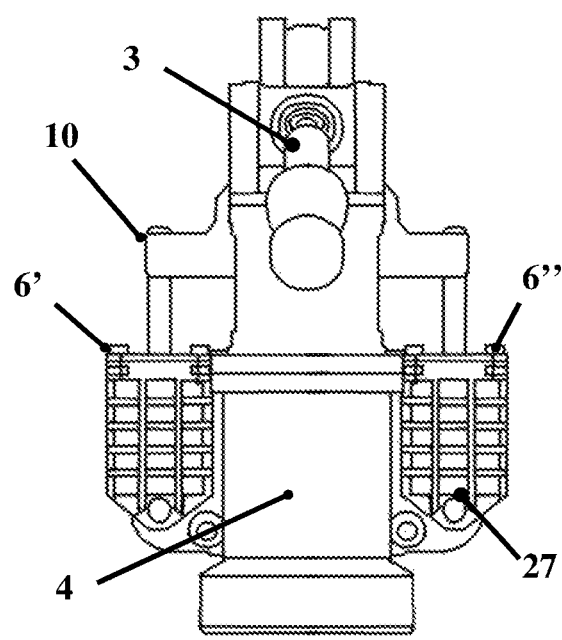
FIG. 9 shows a front view of the driving lever of the machine for making coffee made according to the present invention in a second operating condition.
Figure 10:
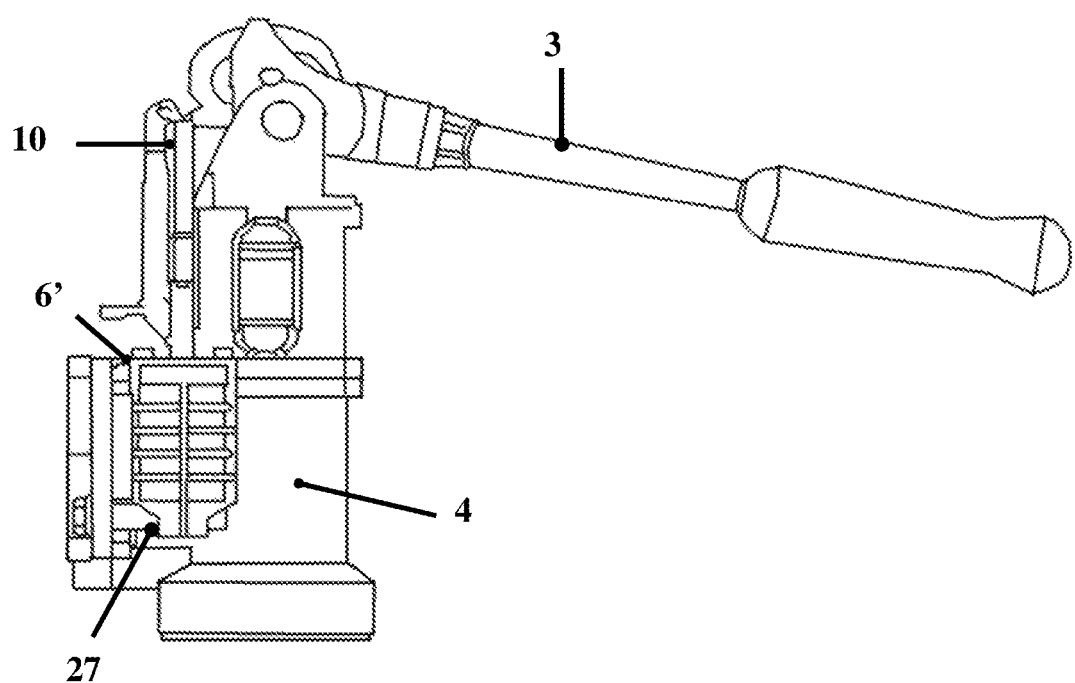
FIG. 10 shows a side view of the lever of FIG. 9.
Figure 11:
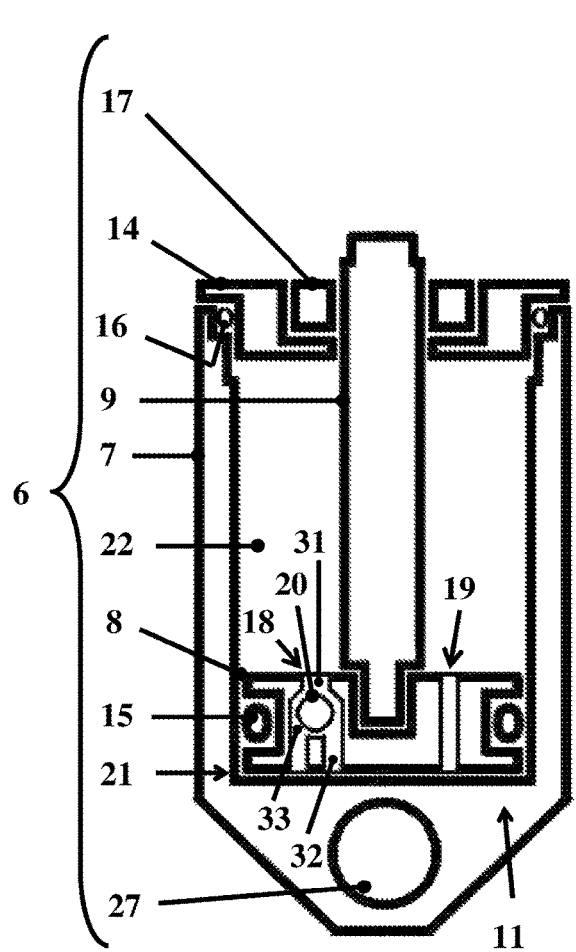
FIG. 11, FIG. 12, FIG. 13, FIG. 14 are sectional views showing the operating sequence of one of the components of the lever of the machine for making coffee made in compliance with the present invention.
Figure 12:
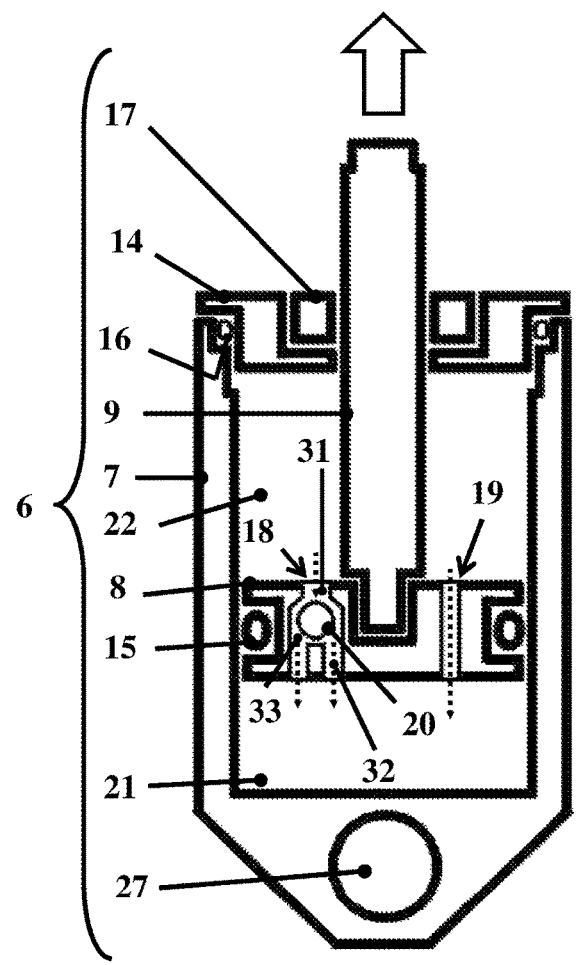
Figure 13:
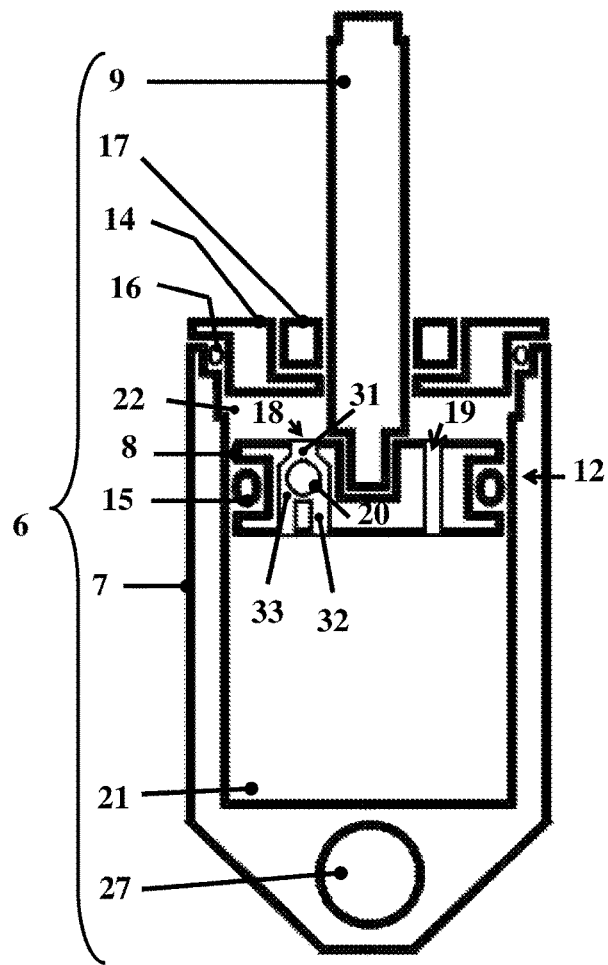
Figure 14:
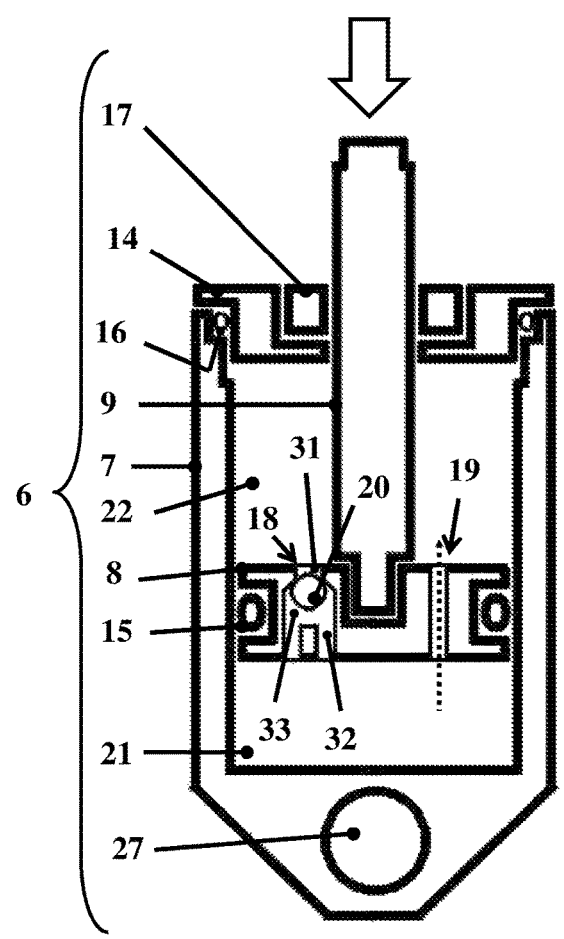
Figure 15:
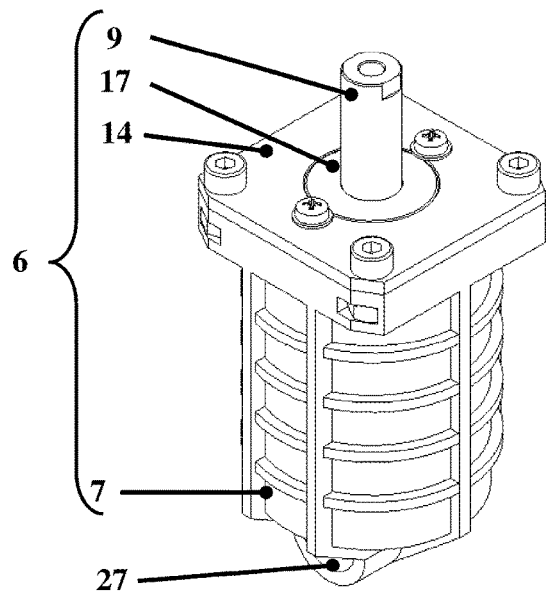
FIG. 15 is a perspective view of the component of the lever of the machine of FIG. 11.
Figure 16:
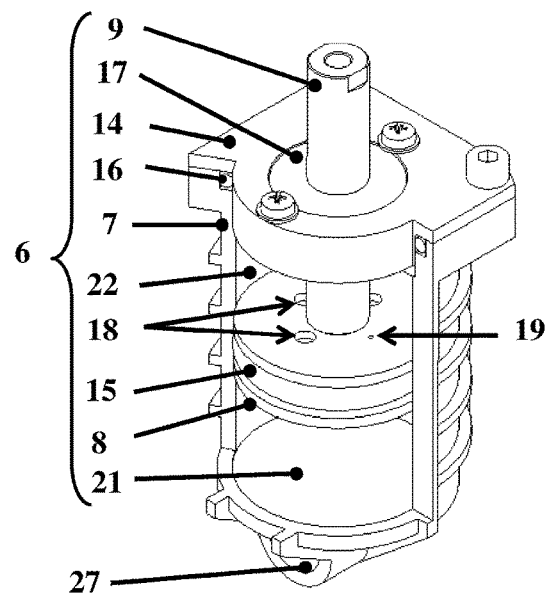
FIG. 16 is a perspective view partially in section of the component of the lever of the machine of FIG. 15.
Figure 17:
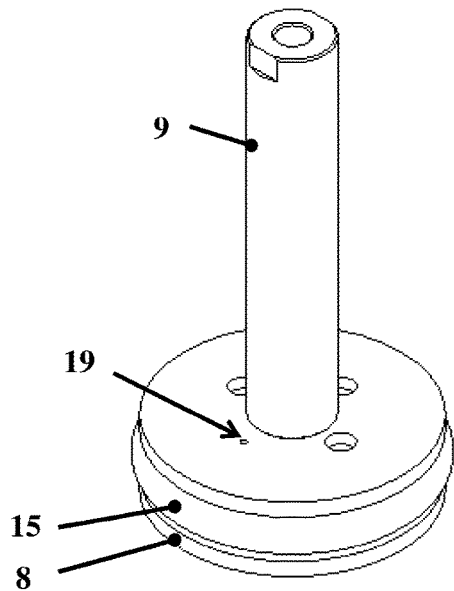
FIG. 17 is a perspective view of one of the internal devices of the component of the lever of the machine of FIG. 11.
Figure 18:
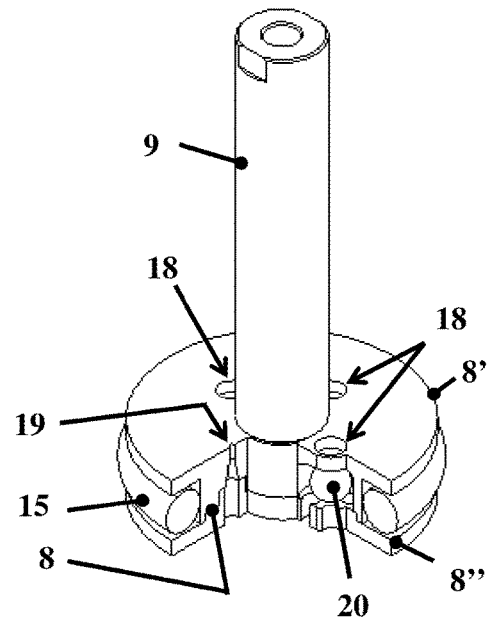
FIG. 18 is a perspective view partially in section of the device of FIG. 17.
Figure 19:
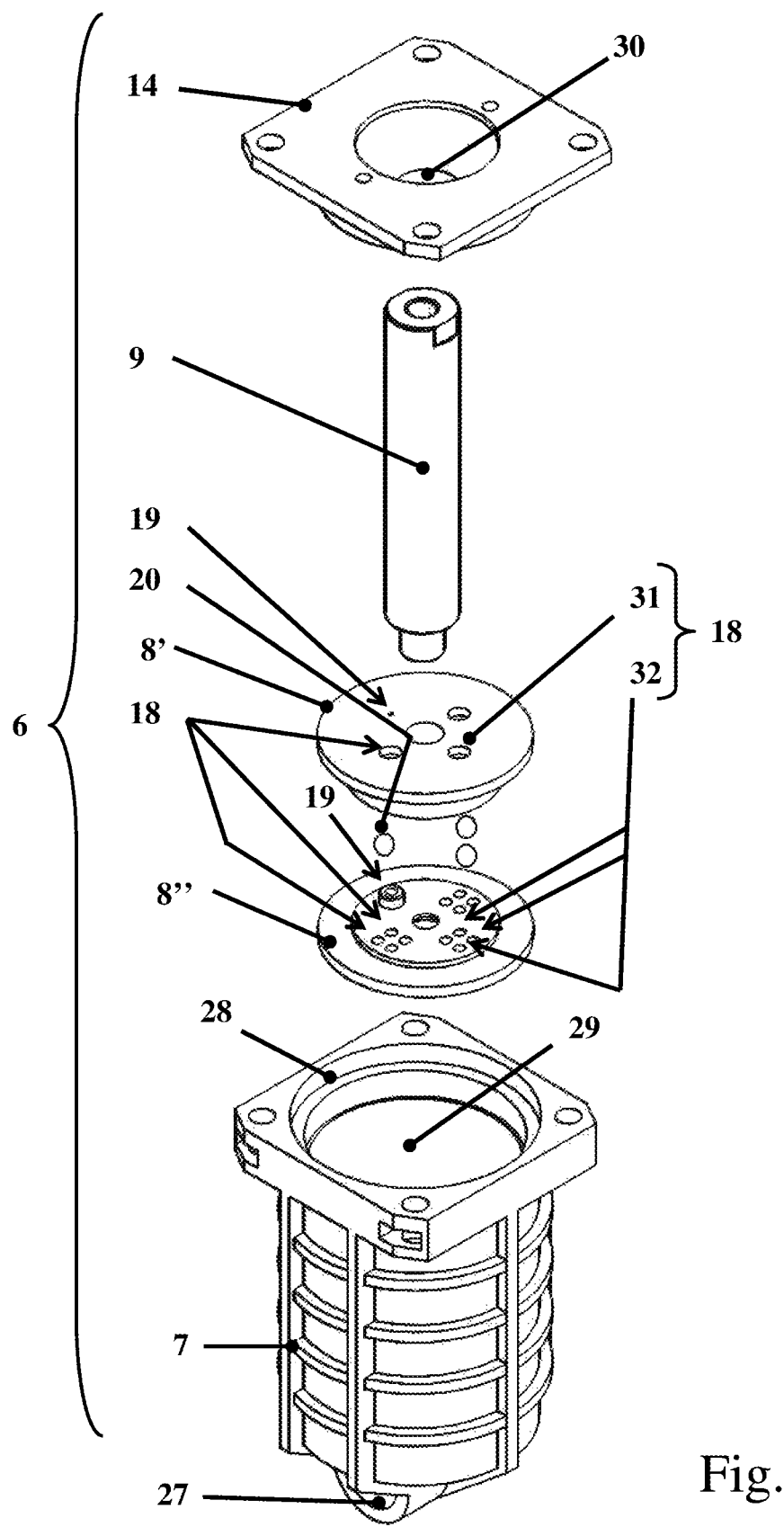
FIG. 19 is an exploded view of the braking device of the lever machine of FIG. 1.

In general, therefore, the present invention relates to (FIG. 1, FIG. 2, FIG. 3) a machine (1) for making espresso coffee of the type provided with at least one delivery unit (23) which is provided with an attachment (24) for a delivery cup (2) and with a driving device (25) provided (FIG. 4, FIG. 5, FIG. 6, FIG. 7, FIG. 8, FIG. 9, FIG. 10) with a lever (3) which is movable from a first lever position (FIG. 4, FIG. 7, FIG. 8) to a second lever position (FIG. 5, FIG. 9, FIG. 10). The delivery unit (23) comprises (FIG. 4, FIG. 5, FIG. 6) a first cylinder (4) inside which a first piston (5) is mounted in a slidable way, which is movable by means of the lever (3) from a first initial position of the first piston to a second position of the first piston. The driving device (25) is provided with return means of the lever (3) from the second lever position to the first lever position. The delivery unit (23) is connected to a hydraulic circuit (13) of the machine (1) in such a way that the movement of the first piston (5) from the first position to the second position causes the charging of hot water within a housing of the first cylinder (4) and in such a way that the movement of the first piston (5) from the second position to the first position causes the discharging of the hot water from the housing of the first cylinder (4) towards the delivery cup (2). The delivery unit (23) comprises at least one braking device (6, 6', 6"), the braking device (6, 6', 6") being configured in such a way as to exert a braking force on the driving device (25) of the delivery unit (23) at least during the movement of the first piston (5) from the second position of the first piston to the first position of the first piston, the braking force braking at least the lever (3) at least during the movement of the lever (3) from the second lever position to the first lever position.

The at least one braking device (6, 6', 6") is configured in such a way as to exert the braking force on the driving device (25) of the delivery unit (23) by means of a mechanical connection to one or more devices selected from the group consisting of the lever (3), a lever linkage for the connection of the lever (3) to the first piston (5), the first piston (5). It will be evident that, as it is a braking force of a system made up of several elements, the braking action can therefore be applied on any of the elements constituting the machine driving system starting from the lever (3) up to the first piston (5) for example by means of the respective rod of the first piston (5).

The machine (1) for making espresso coffee can comprise a pair of braking devices (6, 6', 6") comprising a first braking device (6') and a second braking device (6") wherein the two braking devices (6, 6', 6") are connected to each other by means of a connection (10) constituting a coupling interface with the driving device (25) of the delivery unit (23), the connection (10) being preferably made in the form of a shaped plate.

The braking device (6, 6', 6") comprises (FIG. 11, FIG. 12, FIG. 13, FIG. 14, FIG. 15, FIG. 16, FIG. 17, FIG. 18) a second internally hollow cylinder (7) provided with a cavity (29) filled with a fluid, a second piston (8, 8', 8") being mounted in a slidable way within the cavity (29). The second piston (8, 8', 8") is connected to the delivery unit (23) according to a configuration in which the second piston (8, 8', 8") is movable by means of the lever (3) between a first position (11) and a second position (12), the second piston (8, 8', 8") separating two chambers (21, 22) internal to the cavity (29) of which a first chamber (21) and a second chamber (22) which are separated from each other by the movable interposition of the second piston (8, 8', 8"). The second piston (8, 8', 8"), following the sliding movement within the cavity (29), causes a variation of the volume of the first chamber (21) and of the second chamber (22) and causes a passage of the fluid contained in the cavity (29) between the first chamber (21) and the second chamber (22), the passage of the contained fluid between the first chamber (21) and the second chamber (22) occurring by means of passages (18, 19) in the form of through-openings obtained on the second piston (8, 8', 8") which put in communication with each other the first chamber (21) and the second chamber (22).

The passages (18, 19) comprise one or more first passages (19) wherein the first passages (19) are through-openings obtained on the second piston (8, 8', 8") which put in communication with each other the first chamber (21) and the second chamber (22) and wherein each first passage (19) comprises at least one calibrated hole having a section of such dimensions as to encumber the fluid flow between the first chamber (21) and the second chamber (22).

The passages (18, 19) can also comprise one or more second passages (18) having one of the previously described configurations.

It is provided that in an embodiment the braking device (6, 6', 6") comprises adjusting means for adjusting the braking force. This solution can be obtained for example by making the calibrated hole on a removable element which can be replaced with other corresponding removable elements which are provided with calibrated holes of different sizes. As an alternative, one can provide solutions in which the adjusting means for adjusting the braking force consist of a calibrated hole which is made in the form of a restriction having a variable and adjustable cross-section.

The present invention also relates to an adapting kit for applying the device according to the invention also to existing machines for making espresso coffee, which are subject to the above-mentioned safety problems for the operator as regards the return speed of the lever (3) of the driving device (25). The adapting kit consists of a plurality of elements for adapting a machine (1) for making espresso coffee of the previously described type. The plurality of elements for adapting the machine (1) will comprise at least one braking device (6, 6', 6") made according to the previously described configurations and, furthermore, fixing elements of the braking device (6, 6', 6") to the machine (1) and to the delivery unit (23), the fixing elements being configured to couple with the driving device (25) of the delivery unit (23).

The description of the present invention has been made with reference to the enclosed figures in a preferred embodiment, but it is evident that many possible changes, modifications and variations will be immediately clear to those skilled in the art in the light of the previous description. Thus, it must be underlined that the invention is not limited to the previous description, but it includes all the changes, modifications and variations in accordance with the appended claims.

NOMENCLATURE USED

With reference to the identification numbers in the enclosed figures, the following nomenclature has been used:
1. Machine for making coffee
2. Cup
3. Lever
4. First cylinder
5. First piston
6. Braking device
6'. First braking device
6". Second braking device
7. Second cylinder
8. Second piston
8'. First half-shell of the second piston
8". Second half-shell of the second piston
9. Rod
10. Connection
11. First position
12. Second position
13. Hydraulic circuit
14. Cover
15. First gasket
16. Second gasket
17. Third gasket
18. Second passage
19. First passage
20. Obstruction element
21. First chamber
22. Second chamber
23. Delivery unit
24. Attachment
25. Driving device
26. Delivery nozzle
27. Fixing means
28. Seat
29. Cavity
30. Hole
31. First conduit
32. Second conduit
33. Third chamber

The invention claimed is:
1. An apparatus for making espresso coffee, the apparatus comprising:
at least one delivery unit having a delivery cup attachment, the at least one delivery unit comprising:
a first cylinder having a first piston slidably mounted therein; and
at least one braking device comprising a second cylinder, the second cylinder being internally hollow and connected to a circuit independent of said first cylinder, the second cylinder having a cavity filled with a fluid, said second cylinder having a second piston slidably mounted in said cavity;

a hydraulic circuit connected to the at least one delivery unit; and a driving device having a lever movable between a first position and a second position, the lever cooperative with the first piston so as to move the first piston between a first position and a second position, said driving device moving the lever from the second position back to the first position of the lever, said driving device connected to said hydraulic circuit such that the movement of the first piston from the first position to the second position of the first piston charges water within a housing of said first cylinder and such that the movement of the first piston from the second position of the first piston discharges water from the housing of the first cylinder toward the delivery cup attachment, the at least one braking device exerting a braking force on said driving device during the movement of the first piston from the second position to the first position of the first piston, the braking force braking the lever during the movement of the lever from the second position to the first position of the lever, the second piston being connected to the at least one delivery unit such that the second piston is movable by the lever between a first position and a second position, said second piston defining and separating a first chamber and a second chamber internal of the cavity, a sliding movement of the second piston within the cavity causing a variation of a volume of a first chamber and a volume of the second chamber and causing a fluid in the cavity to pass between the first and second chambers, the second piston having through-openings therein which communicate between the first and second chamber so as to allow the fluid to pass therebetween, wherein the braking device is connected to said driving device such that the movement of the lever from the first position to the second position of the lever starts a delivery of the espresso coffee by charging the return device and to move the second piston from the first position to the second position of the second piston so as to apply a null braking force during the movement of the lever from the first position to the second position of the lever, wherein the braking device is connected to said driving device such that a return of the lever from the second position to the first position of the lever causes the second piston to move from the second position to the first position of the second piston so as to exert a braking force on the lever.

2. The apparatus of claim 1, wherein the braking device exerts the braking force on said driving device by a mechanical connection to at least one of the lever, a lever linkage connecting the lever to the first piston, and the second piston.

3. The apparatus of claim 1, the braking device comprising a first braking device and a second braking device, the first braking device connected to the second braking device by a coupling interface with said driving device.

4. The apparatus of claim 1, wherein the through-openings of the second piston have at least one calibrated hole that restricts a rate of fluid flow between the first and second chambers.

5. The apparatus of claim 4, wherein the at least one calibrated hole has a diameter of between 0.4 millimeters and 1.2 millimeters.

6. The apparatus of claim 1, wherein the second piston has a through-opening that comprises:

a set of first conduits that face the second chamber;

a set of second conduits that face the first chamber;

a third chamber positioned between the set of first conduits and the set of second conduits, the third chamber having a greater diameter than a diameter of the conduits of the set of first conduits and the set of second conduits, the third chamber being in fluid communication with the set of first conduits and the set of second conduits; and an obstruction element positioned in the third chamber and freely movable therein under a pushing action of fluid flow through the through-opening, the obstruction element being positioned in the third chamber in a position dislocated toward the set of first conduits such that the obstruction element interrupts fluid flow between the set of first conduits and the set of second conduits.

7. The apparatus of claim 6, wherein the obstruction element is a sphere having a diameter less than a diameter of the third chamber and greater than a diameter of the conduits of the set of first conduits and the set of second conduits.

8. The apparatus of claim 6, wherein the set of second conduits are at least two conduits that are positioned radially with respect to a central axis of the third chamber.

9. The apparatus of claim 6, wherein the conduits of the set of first conduits have a diameter between 2 millimeters and 5 millimeters, wherein the conduits of the set of second conduits have a diameter between 1.5 millimeters and 4 millimeters.

10. The apparatus of claim 1, wherein the second piston has a diameter of between 25 millimeters and 45 millimeters, the cavity of the second cylinder having a height of between 45 millimeters and 65 millimeters.

11. The apparatus of claim 1, wherein the second piston has a first half-shell and a second half-shell coupled to each other at coupling surfaces thereof, the coupling surfaces having a cavity formed therein that receives a first perimetrical gasket therein.

12. The apparatus of claim 1, the fluid being selected from the group consisting of a gas and an incompressible fluid.

13. The apparatus of claim 1, wherein the braking device is adapted to adjust the braking force of the braking device, wherein the adjustment element is a calibrated hole having a variable and adjustable cross-section.

* * * * *